(12) United States Patent
Liu et al.

(10) Patent No.: US 7,952,561 B2
(45) Date of Patent: May 31, 2011

(54) METHOD AND APPARATUS FOR CONTROLLING APPLICATION USING MOTION OF IMAGE PICKUP UNIT

(75) Inventors: Qifeng Liu, Beijing (CN); Young-su Moon, Seoul (KR); Yoon-kyung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 900 days.

(21) Appl. No.: 11/892,401

(22) Filed: Aug. 22, 2007

(65) Prior Publication Data

US 2008/0117168 A1    May 22, 2008

(30) Foreign Application Priority Data

Nov. 17, 2006   (KR) .................. 10-2006-0114100

(51) Int. Cl.
*G09G 5/08*    (2006.01)
*G09G 5/00*    (2006.01)

(52) U.S. Cl. ........................................ 345/158; 345/169

(58) Field of Classification Search ................... 345/158; 348/207.1, 208.1, 208.14, 208.16; 455/414.1, 455/412.1, 456.1; 382/103, 186, 313, 316; 715/863
See application file for complete search history.

(56) References Cited

U.S. PATENT DOCUMENTS

| | | | | |
|---|---|---|---|---|
| 7,129,927 B2 * | 10/2006 | Mattsson | ....................... | 345/158 |
| 7,379,563 B2 * | 5/2008 | Shamaie | ....................... | 382/103 |
| 7,598,942 B2 * | 10/2009 | Underkoffler et al. | ......... | 345/158 |
| 7,719,569 B2 * | 5/2010 | Ohtake et al. | .................. | 348/170 |
| 7,725,547 B2 * | 5/2010 | Albertson et al. | ............. | 709/206 |
| 7,755,608 B2 * | 7/2010 | Chang et al. | ................... | 345/157 |

* cited by examiner

*Primary Examiner* — Kevin M Nguyen
(74) *Attorney, Agent, or Firm* — Staas & Halsey LLP

(57) ABSTRACT

A method of controlling an application using a motion of an image pickup unit, the method includes storing gestures corresponding to a command to control an application, tracing a motion parameter corresponding to an image that is continuously input, detecting a gesture corresponding to the traced motion parameter from the stored gestures, and outputting a control signal of a command corresponding to the detected gesture.

13 Claims, 9 Drawing Sheets

METHOD AND APPARATUS FOR CONTROLLING APPLICATION USING MOTION OF IMAGE PICKUP UNIT

CROSS-REFERENCE TO RELATED PATENT APPLICATIONS

This application claims the benefit of Korean Patent Application No. 10-2006-0114100, filed on Nov. 17, 2006, in the Korean Intellectual Property Office, the disclosure of which is incorporated herein in its entirety by reference.

BACKGROUND OF THE INVENTION

1. Field of the Invention

The present invention relates to a method and apparatus for controlling an application using a motion of an image pickup unit.

2. Description of the Related Art

Hand-held devices such as mobile phones, digital cameras, digital recorders, PDAs (personal digital associates), and remote controllers, are widely used to control digital TVs, DVDs, and video consoles. Since the size of a hand-held device is small, controlling an application of the hand-held device is inconvenient. For example, since input keys of the hand-held device are so small, it is inconvenient to press a desired input key of the hand-held device. As a replacement tool, a stylus, which is a thin stick like a PDA pen that is used to manually write and input data, is used. However, to use the stylus, a user needs to hold a pocket computer with one hand and input data using the stylus with the other hand, thus requiring the use of both hands and also, an expensive touch screen is needed. Furthermore, in an application such as an interactive game, which requires more direct and smooth control by a game player, the above-described input methods of using the input keys and stylus are not able to properly control the motion of a game player in a 3D game.

To solve such problems, many studies have been conducted on camera motion control in order to control a hand-held device having a camera using the motion of the hand-held device. As a result of these studies, an invention has been made in which the motion of the hand-held device is used as an input of a user interface and the motion is traced by an image obtained by a camera. However, since the content of the invention is too conceptual and an application must be selected using an additional input key, a problem of still having to use an input key exists. Also, another invention has been introduced in which the motion of a camera is used as the positions of graphic components in a display and the motion of a camera is sensed by a gyroscope or the camera. However, the invention depicts a limited application such as a sub-image selection and thumb nail pointing which means the position of a cursor in a reduced image viewed prior to printing, and has a problem of pointing with a low accuracy.

Also, another invention has been suggested in which a viewed navigation and a display extension are performed by changing directions along only two axes. However, the invention has a problem in that incurred costs are high and is heavy due to the fact that a miniature sensor is necessary in the invention.

Also, another invention has been made in which the motion of a camera is used as an input of a user interface of a mobile phone and the motion of a camera is traced by obtained images. However, the invention has a problem in that the invention is based on simulated data and a target application is hardly discussed for the invention so that a practical use of the invention is uncertain.

Also, another invention has been made in which the motion of a camera is used as an input of a user interface of a mobile phone, the motion of a camera is traced by obtained images, and the motion of a camera is simply traced from a translation motion. However, the invention has a problem in that the invention cannot be applied to a complicated user interface because a model of a motion is too simple.

SUMMARY OF THE INVENTION

To solve the above and/or other problems, the present invention provides a method and apparatus for conveniently controlling an application of a hand-held device with only the motion of an image pickup unit for receiving an image without requiring additional hardware.

Also, the present invention provides a computer readable recording medium recording a program for executing the above method on a computer.

According to an aspect of the present invention, there is provided a method of controlling an application using a motion of an image pickup unit comprises storing gestures corresponding to a command to control an application, tracing a motion parameter corresponding to an image that is continuously input, detecting a gesture corresponding to the traced motion parameter from the stored gestures, and outputting a control signal of a command corresponding to the detected gesture.

The method may further include continuously obtaining an image through the movement of an apparatus having the image pickup unit. In the tracing of a motion parameter corresponding to an image that is continuously input, the obtained image may be continuously received and a motion parameter corresponding to the received image is traced.

The storing of gestures corresponding to a command to control an application may further include classifying the gestures into gestures controlling the same application and defining the classified gestures as a predetermined set, and the gestures are stored in defined sets.

The storing of gestures corresponding to a command to control an application may further include defining gestures corresponding to all commands controlling the application corresponding to a set of the defined gestures, and the defined gestures are stored in defined sets.

The detecting of a gesture corresponding to the traced motion parameter from the stored gestures may include selecting a set of gestures corresponding to an application receiving the control signal from the sets of gestures, and detecting a gesture corresponding to the traced motion parameter from the selected set of gestures.

The tracing of a motion parameter corresponding to an image that is continuously input may include detecting a characteristic point of the input image, tracking a trace in time and space of the detected characteristic point from the continuously input image, and tracing a motion parameter corresponding to the trace in time and space of the tracked characteristic point.

The motion parameter may be formed of three rotation motions and three translation motions.

According to another aspect of the present invention, there is provided a computer readable recording medium recording a program for executing any of the above methods on a computer.

According to another aspect of the present invention, there is provided an apparatus for controlling an application using a motion of an image pickup unit including a motion tracing unit tracing a motion parameter corresponding to an image that is constantly input, a gesture model storing unit storing gestures corresponding to commands to control the application, and a motion analysis unit detecting a gesture corresponding to a motion parameter traced by the motion tracing unit from the gesture model storing unit and outputting a control signal of a command corresponding to the detected gesture.

The apparatus may further include an image pickup unit continuously obtaining an image, wherein the motion tracing unit continuously receives the obtained image and traces a motion parameter corresponding to the received image.

The gesture model storing unit may further include a gesture set defining unit which classifies the gestures into gestures controlling the same application and defines the classified gestures as a predetermined set, and the gestures are stored in defined sets.

The gesture model storing unit may further include a gesture defining unit which defines gestures corresponding to all commands controlling the application corresponding to a set of the defined gestures, and the defined gestures are stored in defined sets.

The motion analysis unit may include the gesture set selection unit selecting a set of gestures corresponding to an application receiving the control signal from the sets of gestures stored in the gesture model storing unit, and the gesture selection unit detecting a gesture corresponding to the traced motion parameter from the selected set of gestures.

The tracing of a motion parameter corresponding to an image that is continuously input may include detecting a characteristic point of the input image, tracking a trace in time and space of the detected characteristic point from the continuously input image, and tracing a motion parameter corresponding to the trace in time and space of the tracked characteristic point.

The motion parameter may be formed of three rotation motions and three translation motions.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
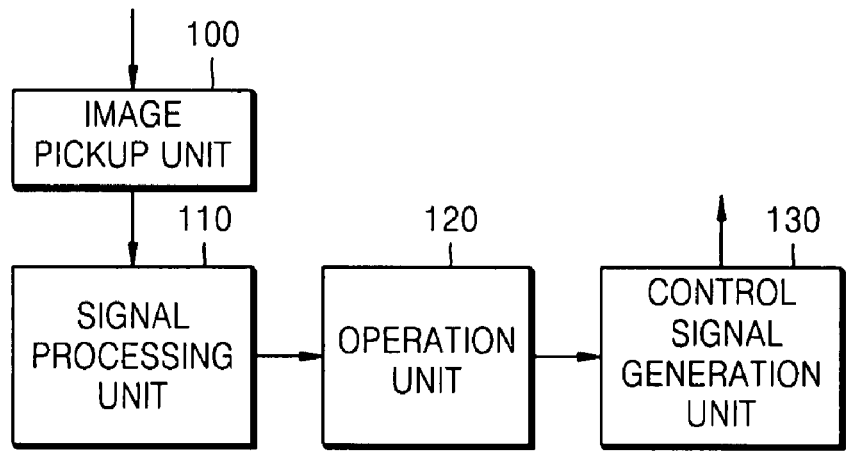
FIG. 1 is a block diagram of an apparatus for controlling an application using the motion of an image pickup unit according to an embodiment of the present invention.

FIG. 1 is a block diagram of an apparatus for controlling an application using the motion of an image pickup unit according to an embodiment of the present invention. Referring to FIG. 1, the apparatus for controlling an application using the motion of an image pickup unit includes an image pickup unit 100, a signal processing unit 110, an operation unit 120, and a control signal generation unit 130.

The image pickup unit 100 continuously photographs images, receives photographed images, and outputs an image signal of the received images to the signal processing unit 110. The image pickup unit 100 in the present embodiment is a module having the functions of obtaining an image through a lens and displaying the obtained image on an image display unit (not shown). Although a conventional camera is used as the image pickup unit 100, however, the present invention is not limited thereto.

The signal processing unit 110 receives the image signal of the received images output from the image pickup unit 100, converts the received image signal into a digital image signal, and outputs the digital image signal to the operation unit 120. The operation unit 120 receives the digital image signal output from the signal processing unit 110, operationally processes the digital image signal, and outputs a command to control the application of the apparatus that is to be controlled.

Figure 2:
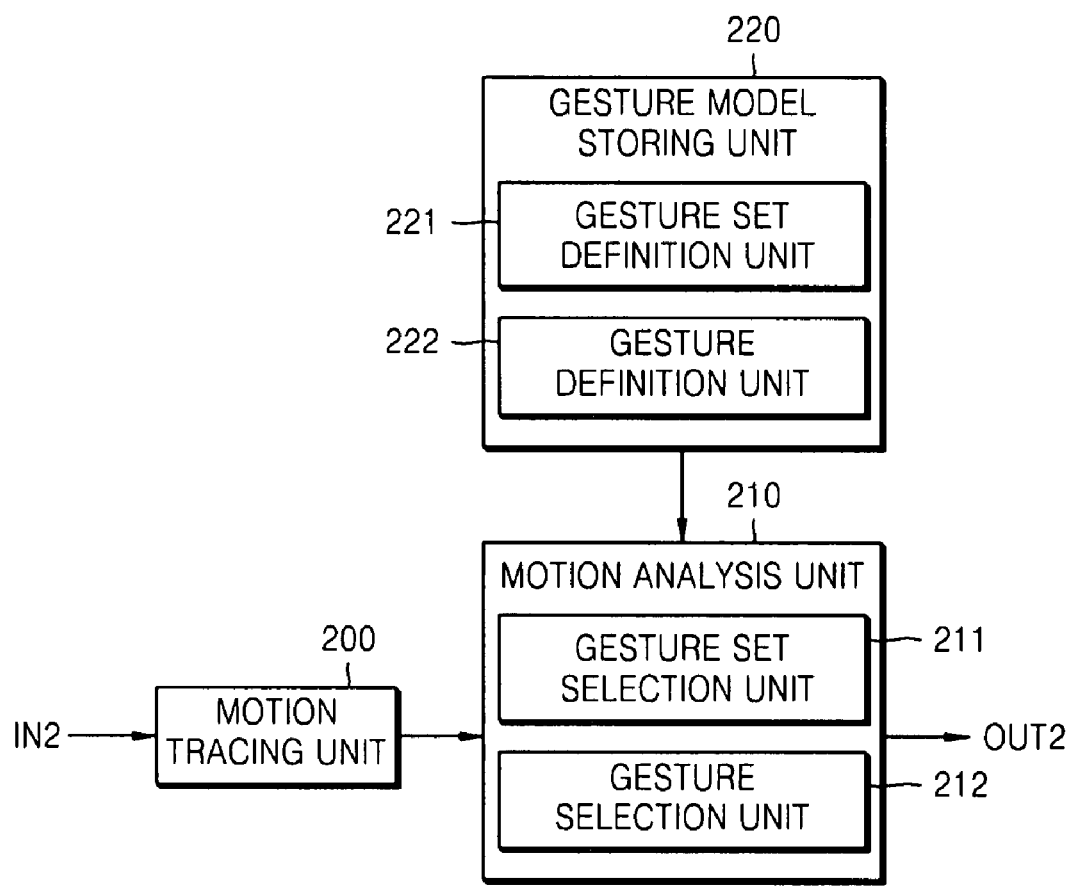
FIG. 2 is a block diagram of an operation unit of the apparatus of FIG. 1, according to an embodiment of the present invention.

FIG. 2 is a block diagram of the operation unit 120 of the apparatus of FIG. 1, according to an embodiment of the present invention. Referring to FIG. 2, the operation of the operation unit 120 of the apparatus of FIG. 1 will be described in detail. The operation unit 120 includes a motion tracing unit 200, a motion analysis unit 210, and a gesture model storing unit 220 including a gesture set definition unit 221 and a gesture definition unit 222. Also, the motion analysis unit 210 includes a gesture set selection unit 211 and a gesture selection unit 212.

The motion tracing unit 200 receives the digital image signal output from the signal processing unit 110 through an input port 2 (IN2), traces the motion of the image pickup unit 100 from the received digital image signal, and outputs a traced motion parameter to the motion analysis unit 210.

Figure 3:
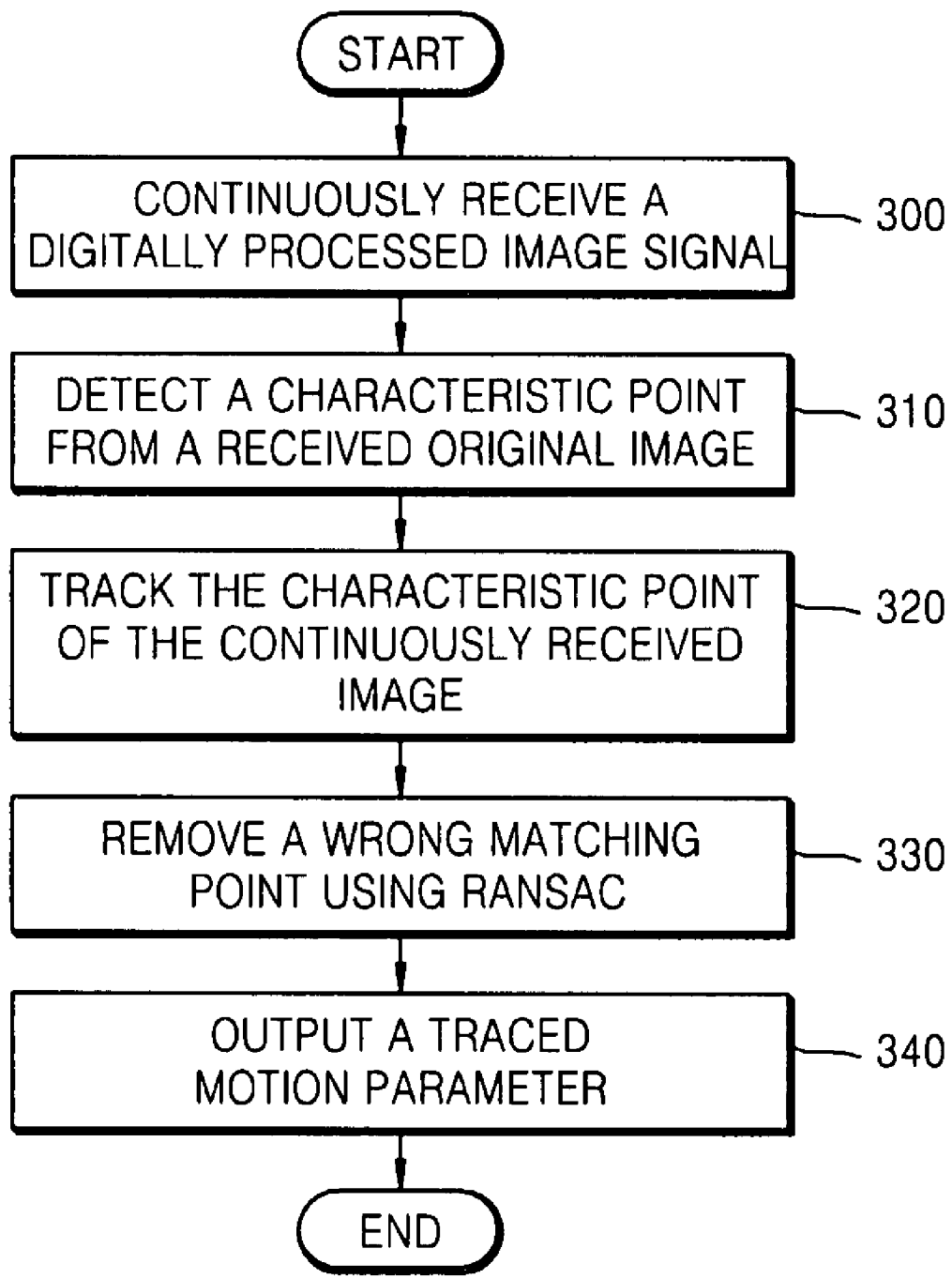
FIG. 3 is a flowchart of a method of tracing a motion parameter in a motion tracing unit of the operation unit of FIG. 2, according to an embodiment of the present invention.

FIG. 3 is a flowchart of a method of tracing a motion parameter in the motion tracing unit 200 of the operation unit 120 of FIG. 2, according to an embodiment of the present invention. Referring to FIG. 3, the operation of the motion tracing unit 200 will be described in detail.

In Operation 300, the digital image signal processed by the signal processing unit 110 is continuously received by the operation unit 120. In Operation 310, a characteristic point is detected from the received original image. The characteristic point means a point that is distinguished from other surrounding pixels in the received original image. Even when a variety of methods can be used to detect the characteristic point, in the present embodiment, the characteristic point is detected based on a corner. That is, a pixel having the greatest difference in concentration from among the surrounding pixels in an image displayed in units of pixels is detected as the characteristic point.

In Operation 320, the characteristic point of an image that is continuously received is tracked, where tracking means tracking of a trace of the characteristic point in terms of a change in time and space. The characteristic point is tracked by measuring a degree of similarity by comparing the brightness of the characteristic point in the continuously received image. A pyramid Lucas-Kanade (PLK) algorithm is used as a method of tracking the characteristic point of an image that is continuously received. Through the PLK algorithm which is as the method of tracking the characteristic point, a resolution of the characteristic point is gradually extended in a pyramid form. Hence, the characteristic point is gradually tracked first at a low resolution and then at a high resolution. When the tracking is performed by increasing the resolution as described above, a lot of the characteristic points of the image can be gradually tracked so that the tracking is possible even when the motion of image is large.

In Operation 330, a wrongly corresponding to point is removed using a random sample consensus (RANSAC) paradigm. The RANSAC paradigm signifies that parameters of mathematical models are traced from randomly sampled data. In this case, the randomly sampled data may include data having a value that is quite different from each data. When the data is sampled to trace the parameters of mathematical models, the traced parameters are quite different from parameters traced from each data. When the parameters traced as above and the parameters traced from each data are quite different from each other, parameters are traced by sampling data excluding such data, which is the RANSAC paradigm. In the present embodiment, by removing the wrongly matching points using the RANSAC paradigm, accurate motion parameters are traced. The accurate motion parameters traced in Operation 330 consists of three translation motions in x, y, and z axes directions and three rotation motions rotating around the x, y, and z axis directions.

Figure 4A:
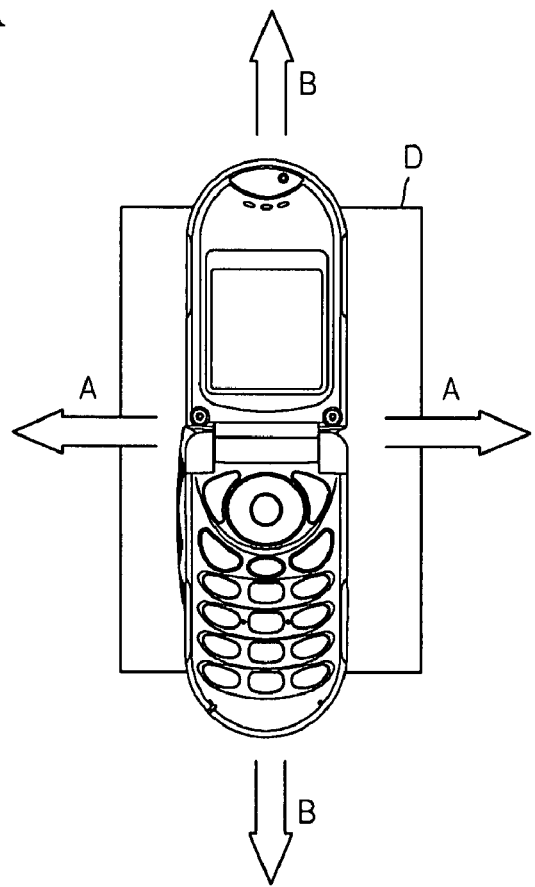
FIG. 4A illustrates a translation motion that constitutes a traced motion parameter according to an embodiment of the present invention.
Figure 4A:
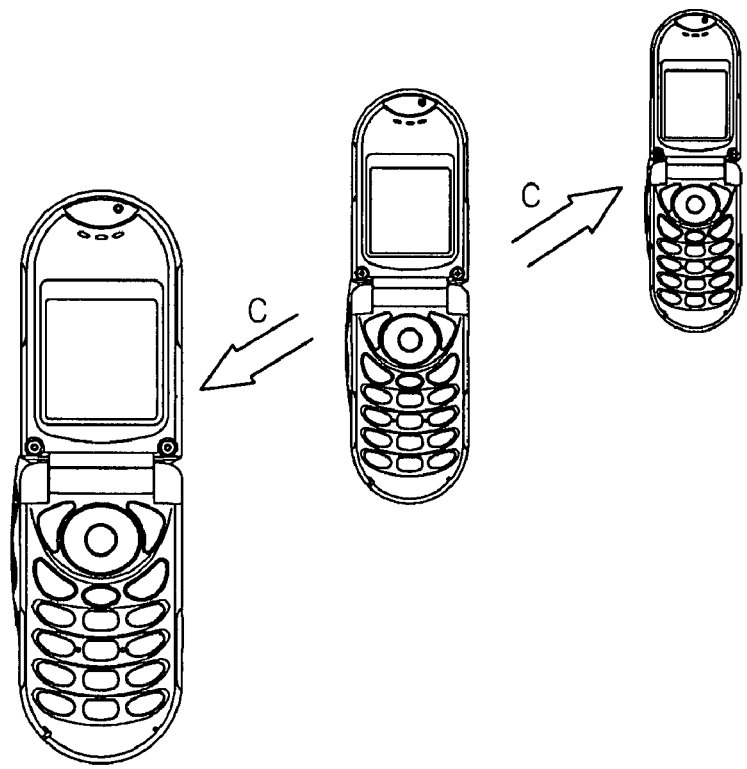

FIG. 4A illustrates a translation motion that constitutes a traced motion parameter according to an embodiment of the present invention. As shown in FIG. 4A, the translation motion constituting the traced motion parameter can be indicated in three forms. The translation motion as shown in FIG. 4A includes a first translation motion in which the apparatus having the image pickup unit is moved in direction A, a second translation motion in which the apparatus having the image pickup unit is moved in direction B, and a third translation motion in which the apparatus having the image pickup unit is moved in direction C. The first and second translation motions are movements relative to an image plane while the third translation motion is a forward and a backward movement with respect to the image plane. The image plane means a plane parallel to an image photographed using the lens of the image pickup unit. Conventionally, for a mobile phone shown in FIG. 4A, since the lens of the mobile phone is located at the rear surface of the mobile phone, the image plane is parallel to the front surface of the mobile phone as indicated by plane D of FIG. 4A.

Figure 4B:
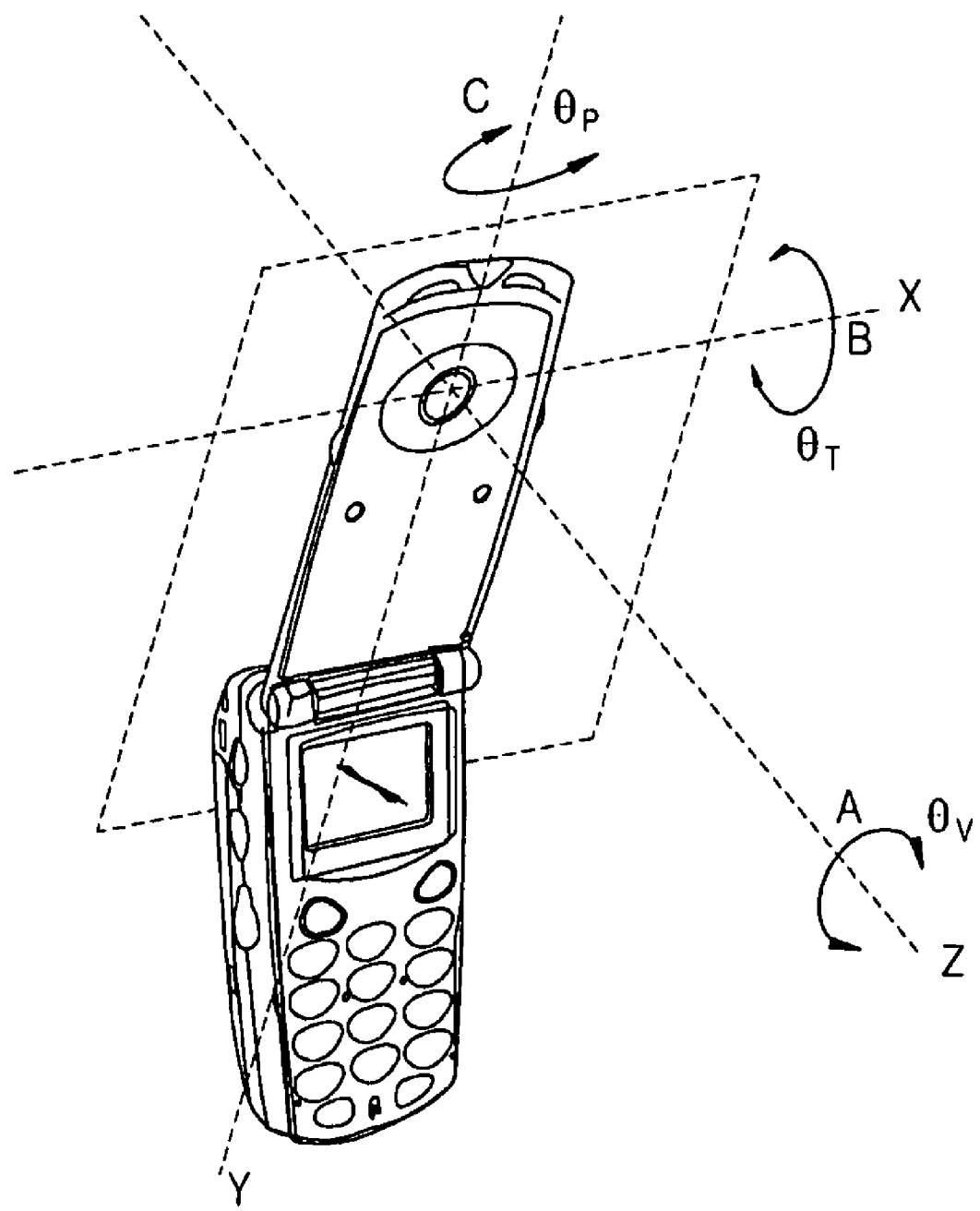
FIG. 4B illustrates a rotation motion that constitutes a traced motion parameter according to an embodiment of the present invention.

FIG. 4B illustrates a rotation motion that constitutes a traced motion parameter according to an embodiment of the present invention. As shown in FIG. 4B, the rotation motion that constitutes the traced motion parameter can be indicated in three forms. The first form is a first rotation motion for a rotation around a Z-axis, which is an optical axis of the image pickup unit, that is, direction A. The second form is a second rotation motion for a rotation around an X-axis of the image plane of a camera, that is, direction B. The third form is a third rotation motion for a rotation around a Y-axis of the image plane of a camera, that is, direction C. The optical axis of the image pickup unit that works as a base of the first rotation motion means a direction in which the lens of the image pickup unit faces. Conventionally, since the lens is located at the rear surface of a mobile phone, the Z-axis is the optical axis of the image pickup unit. The angle for the first rotation motion is a rotation angle, the angle for the second rotation motion is a tilt angle, and the angle for the third rotation motion is a pan angle.

As shown in FIGS. 4A and 4B, the parameter traced by the motion tracing unit 200 of FIG. 2 can be indicated by the first, second and third translation motions and the first, second and third rotation motions as expressed by Equation 1.

$$P=(x,y,z,\theta v, \theta p, \theta t)$$ [Equation 1]

In Equation 1, P is a motion parameter, x is a movement distance in the x axis direction, y is a movement distance in the y axis direction, z is a movement distance in the z axis direction, $\theta v$ is a rotation angle, $\theta p$ is a pan angle, and $\theta t$ is a tilt angle.

Referring back to FIG. 3, in Operation 340, the traced motion parameter is output to the motion analysis unit 210. Referring back to FIG. 2, the motion analysis unit 210 detects from the gesture model storing unit 220 a gesture corresponding to the traced motion parameter received from the motion tracing unit 200 and outputs a control command corresponding to the detected gesture.

Figure 5:
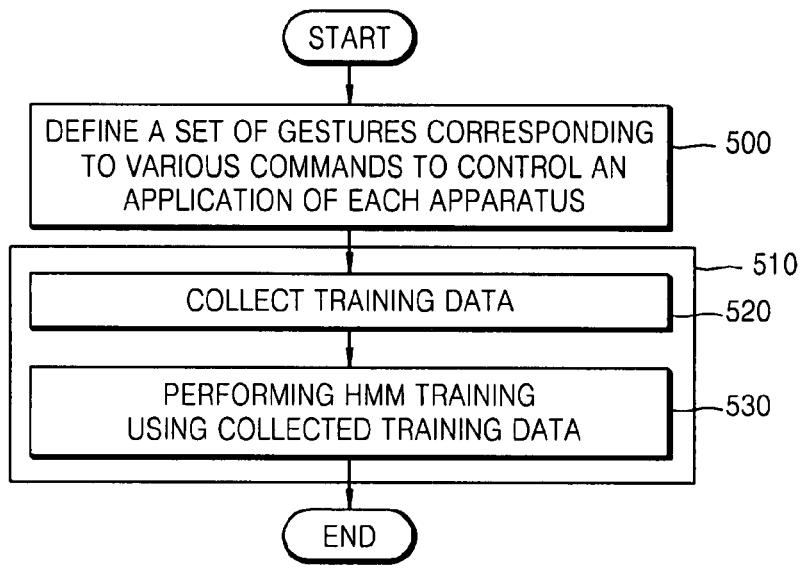
FIG. 5 is a flowchart illustrating the operation of a gesture model storing unit of the operation unit of FIG. 2, according to an embodiment of the present invention.

FIG. 5 is a flowchart of the operation of the gesture model storing unit 220 of the operation unit 120 of FIG. 2, according to an embodiment of the present invention. Referring to FIG. 5, the operation of the gesture model storing unit 220 of the operation unit 120 of FIG. 2 will be described in detail.

In Operation 500, the gesture set definition unit 221 of the gesture model storing unit 220 defines sets of gestures corresponding to various commands to control the application of the apparatus. The sets of gestures signify a variety of gestures corresponding to all commands to control the specific same application.

Figure 6:
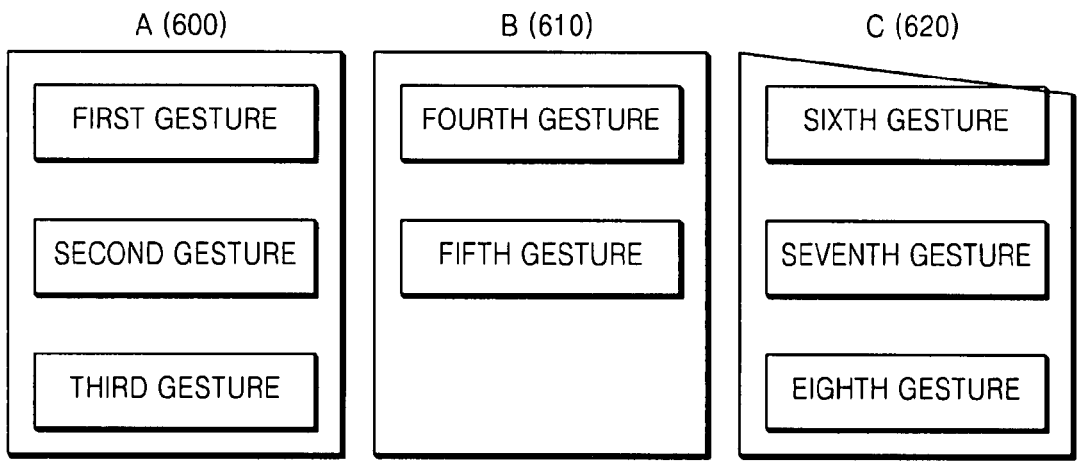
FIG. 6 is a block diagram illustrating a set of gestures stored in the gesture model storing unit of the operation unit of FIG. 2, according to an embodiment of the present invention.

FIG. 6 is a block diagram illustrating the sets of gestures stored in the gesture model storing unit 220 of FIG. 2. As shown in FIG. 6, the gestures are classified according to whether the gestures control the same application. The classified gestures are defined as sets of gestures and the respective gestures are stored in defined sets. In the present embodiment, gestures, for example, a first gesture, a second gesture, and a third gesture corresponding to all commands to control application A are defined as a set A 600 and stored in the gesture model storing unit 220. Other gestures, for example, a fourth gesture and a fifth gesture, corresponding to all commands to control application B are defined as a set B 610 and stored in the gesture model storing unit 220. Other gestures, for example, a sixth gesture, a seventh gesture, and an eighth gesture, corresponding to all commands to control an application C are defined as a set C 620 and stored in the gesture model storing unit 220. The above classification is due to the fact that different applications are executed for the respective apparatuses and the commands to control the applications are different from each other. Thus, the gestures corresponding to a command to control an application are previously stored in application units. Such storing process can be performed by a user or a product manufacturer by previously defining gestures corresponding to a command to control an application of an apparatus that is to be controlled and storing the defined gestures in the gesture model storing unit 220. Since all commands to control each application are defined corresponding to the gestures, it is possible to control the application only with the gestures.

Figure 7:
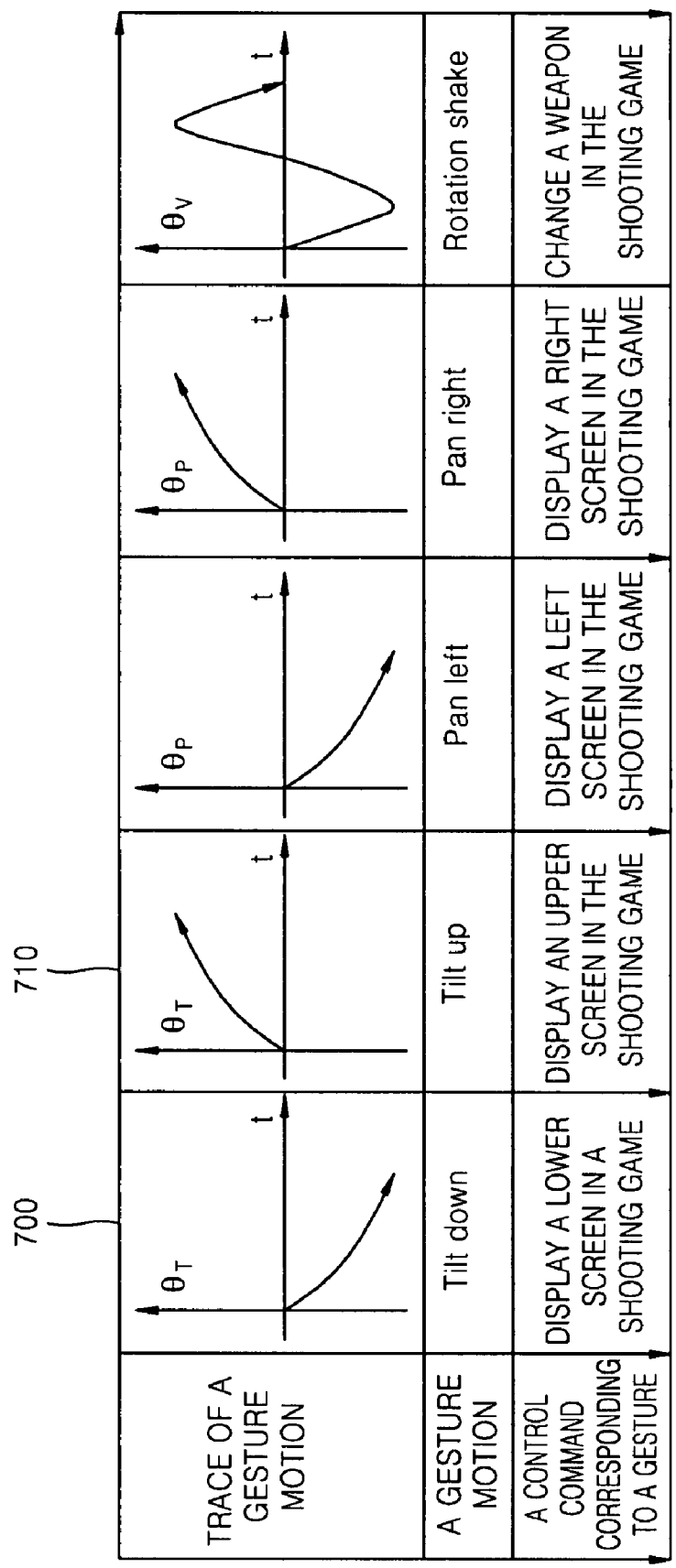
FIG. 7 illustrates gestures for controlling an application according to an embodiment of the present invention.

FIG. 7 illustrates a set of gestures for controlling an application according to an embodiment of the present invention. As shown in FIG. 7, the gesture definition unit 222 of the gesture model storing unit 220 of FIG. 2 previously defines commands to control an application of each apparatus and gestures corresponding to the commands in sets of gestures. FIG. 7 illustrates the gestures corresponding to commands to control an application such as a shooting game according to an embodiment of the present invention. A tilt angle decreasing gesture 700 is a gesture that decreases a tilt angle as time passes and is defined as a control command to display a lower screen in an application such as a shooting game. A tilt angle increasing gesture 710 (not shown) is a gesture that increases a tilt angle as time passes and is defined as a control command to display an upper screen in an application such as a shooting game. Since these gestures are arbitrarily defined, the present invention can diversely define gestures not limited to the gestures illustrated in FIG. 7.

Referring back to FIG. 5, in Operation 510, the gesture received in Operation 500 is depicted using a hidden Markov model (HMM). In the present embodiment, the gesture corresponding to the command to control an application is indicated by a parameter of each state. Thus, operation 510 has been described in detail.

In Operation 520, training data is collected. In the present embodiment, a directional vector indicating the motion of the image pickup unit is collected. In Operation 530, HMM training is performed using the collected training data. With the parameter of a gesture expressing each state, a possibility of moving to another state is calculated through the directional vector that moves to each state. Hence, when the possibility of moving to each state is determined through the training process, the motion parameter is modeled to fit to the HMM model.

Referring back to FIG. 2, the gesture set selection unit 211 selects a gesture set corresponding to an apparatus that is to be controlled from the gesture model storing unit 220. Hence, the gesture set corresponding to an apparatus that is to be controlled is selected from applications stored in the gesture model storing unit 220 in sets of gestures.

When a motion parameter satisfying the highest possibility of the HMM models of a selected gesture set is received from the motion analysis unit 210, the gesture selection unit 212 detects a gesture of the HMM model corresponding thereto from the gesture model storing unit 220. The input motion parameter is recognized as a motion corresponding to the HMM model and a control command of an application corresponding to the motion is output through an output port 2 (OUT 2).

Referring back to FIG. 1, the control signal generation unit 130 receives the control command of an application and generates a command signal corresponding to the received control command of an application. The generated command signal is input to an application of an apparatus that is to be controlled. The apparatus that is to be controlled may be an apparatus having an image pickup unit to trace a motion parameter or an additional apparatus with no image pickup unit. That is, the apparatus that is to be controlled may be the same apparatus as the apparatus generating a control signal or may not be the same apparatus as the apparatus generating a control signal.

Figure 8:
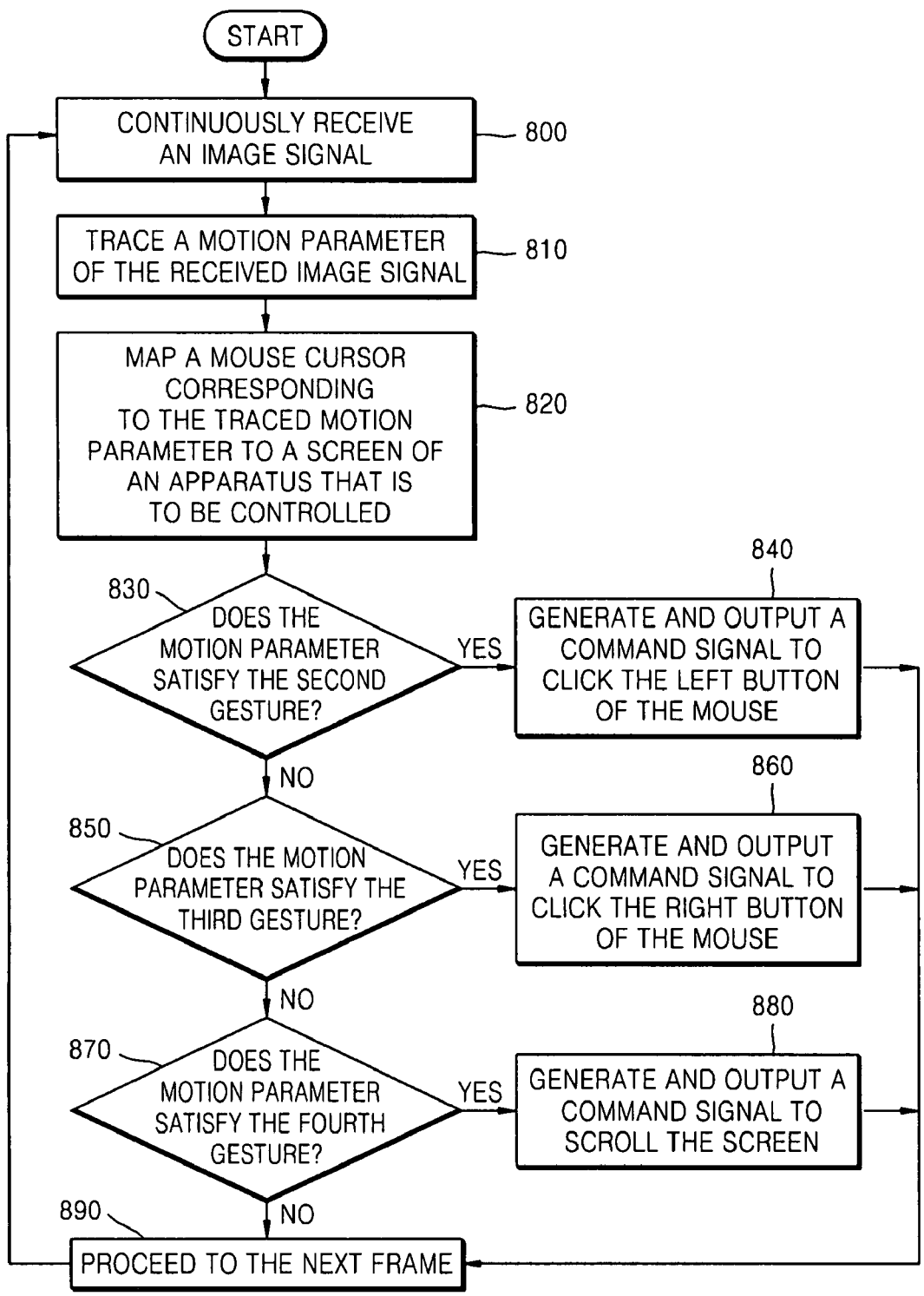
FIG. 8 is a flowchart of a method of controlling an application using the motion of an image pickup unit according to an embodiment of the present invention.

FIG. 8 is a flowchart of a method of controlling an application using the motion of an image pickup unit according to an embodiment of the present invention. In FIG. 8, a computer is controlled by matching the motion of the image pickup unit to a virtual mouse according to an embodiment of the present embodiment. In the present embodiment, four gestures corresponding to the virtual mouse are previously defined.

A first gesture is defined as a motion that performs a translation motion for obtaining a close image or a pan or tilt motion for obtaining a far image. The first gesture is set to correspond to an action when a cursor of the virtual mouse is moved. A second gesture is defined as a motion when the image pickup unit is temporarily still. The second gesture is set to correspond to an action when the left button of the virtual mouse is clicked. A third gesture is defined as a motion when the image pickup unit is lightly shook. The third gesture is set to correspond to an action when the right button of the virtual mouse is clicked. A fourth gesture is defined as a translation motion when the image pickup unit is moved back and forth with respect to an image plane. The fourth gesture is set to correspond to an action when the virtual mouse scrolls a screen.

In Operation 800, the digital image signal is continuously received, that is, an image signal obtained by digitally processing an image input to the image pickup unit is continuously received by the signal processing unit. In Operation 810, a motion parameter of the received digital image signal is traced. The motion parameter formed by the three translation motions of FIG. 4A and the three rotation motions of FIG. 4B is traced. The traced motion parameter that is formed by the three translation motions and three rotation motions is expressed by Equation 1.

In Operation 820, a mouse cursor corresponding to the traced motion parameter is mapped to a screen of an apparatus that is to be controlled. A motion vector of the mouse cursor is determined using Equation 2.

$$\begin{bmatrix} u \\ v \end{bmatrix} = \frac{u_0}{\sqrt{x^2 + y^2}} \begin{bmatrix} x \\ y \end{bmatrix} \qquad \text{[Equation 2]}$$

In Equation 2, x is a movement distance of the traced motion parameter in the x axis direction, y is a movement distance of the traced motion parameter in the y axis direction, $u_0$ is a unit length on a screen of the apparatus, u is an x-directional vector of the mouse cursor, and v is a y-directional vector of the mouse cursor. Hence, the mouse cursor displayed on a 2-D screen of the apparatus is indicated as a 2-D directional vector by using the traced motion parameter.

Also, the position of the mouse cursor that moves corresponding to the traced motion parameter is determined using Equation 3. The position of the mouse cursor displayed on a screen of the apparatus is determined using Equation 3.

$$\begin{bmatrix} x' \\ y' \\ 1 \end{bmatrix} = \begin{bmatrix} s\cos\theta & -s\sin\theta & u \\ s\sin\theta & s\cos\theta & v \\ 0 & 0 & 1 \end{bmatrix} * \begin{bmatrix} x \\ y \\ 1 \end{bmatrix} \qquad \text{[Equation 3]}$$

In Equation 3, x is the initial x coordinate of the mouse cursor displayed on the screen of an apparatus, y is the initial y coordinate of the mouse cursor displayed on the screen of an apparatus, u is an x-directional vector of the mouse cursor, v is a y-directional vector of the mouse cursor, s is a scale factor, θ is an angle, x' is an x coordinate of the mouse cursor that is moved, and y' is a y coordinate of the mouse cursor that is moved. The position of the mouse cursor that is moved on the screen of the apparatus can be calculated through Equation 3.

In Operation 830, it is checked whether the traced motion parameter satisfies the second gesture defined as a temporary still motion. When the traced motion parameter satisfies the second gesture, Operation 840 is performed. Otherwise, Operation 850 is performed. In Operation 840, a command signal corresponding to the action to click the left button of the virtual mouse, which corresponds to the second gesture, is generated and output, and Operation 890 is performed.

In Operation 850, it is checked whether the traced motion parameter satisfies the third gesture defined as a lightly shaking motion. When the traced motion parameter satisfies the third gesture, Operation 860 is performed. Otherwise, Operation 870 is performed. In Operation 860, a command signal corresponding to the action when the right button is clicked of the virtual mouse, which corresponds to the third gesture, is generated and output, and Operation 890 is performed.

In Operation 870, it is checked whether the traced motion parameter satisfies the fourth gesture that is defined as a translation motion of back and forth moving with respect to the image plane. When the traced motion parameter satisfies the fourth gesture, Operation 880 is performed. Otherwise Operation 890 is performed. In Operation 880, a command signal corresponding to allow the virtual mouse to scroll a screen, which corresponds to the fourth gesture, is generated and output, and Operation 890 is performed.

In Operation 890, the operation unit proceeded to the next frame and Operation 800 is performed. As described above, when the flowchart of the method of FIG. 8 is performed, a computer that is controlled using the virtual mouse can be controlled with only the motion of the image pickup unit by corresponding to the motion of the image pickup unit to the motion of the virtual mouse.

Figure 9:
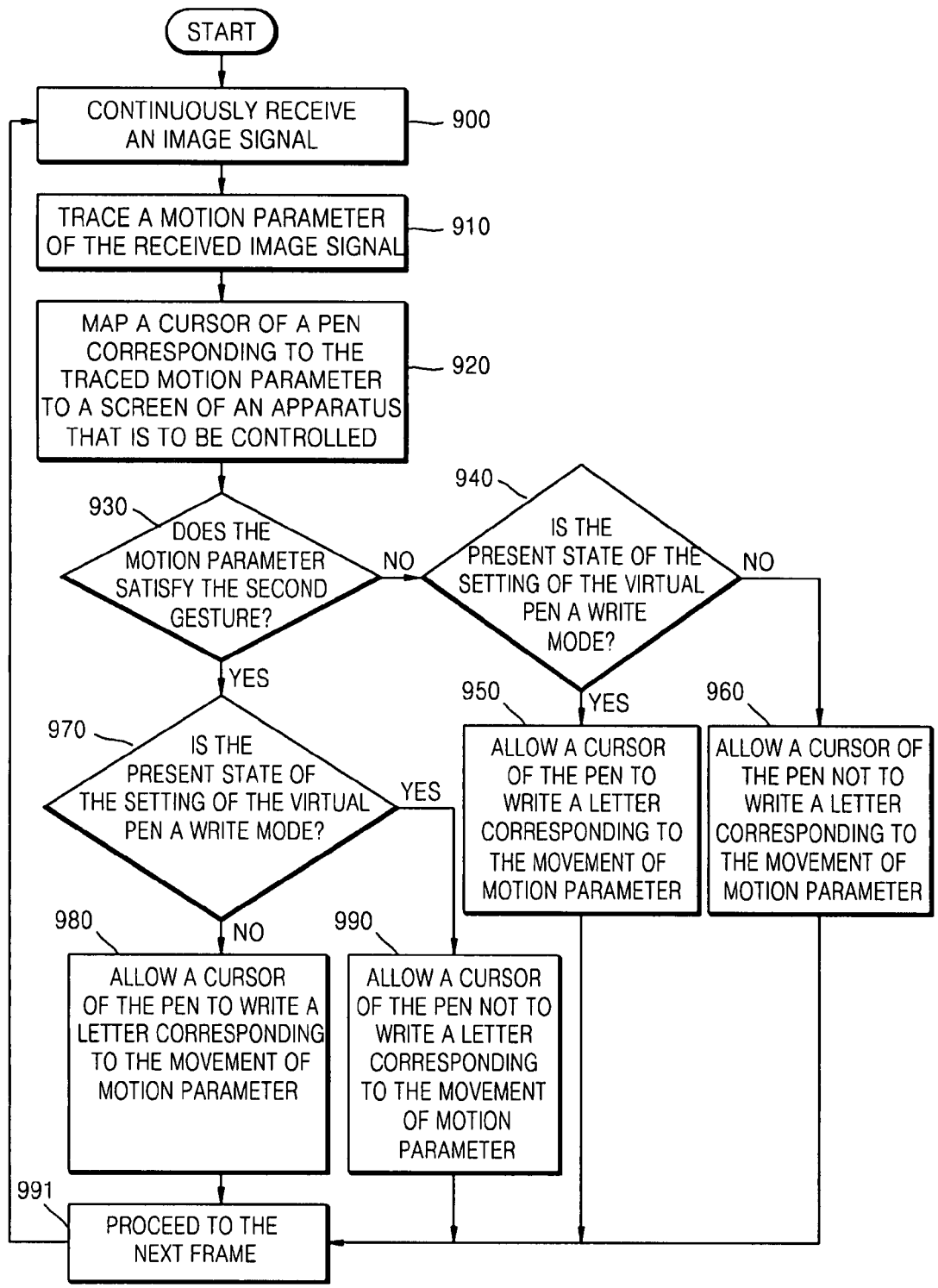
FIG. 9 is a flowchart of a method of controlling an application using the motion of an image pickup unit according to another embodiment of the present invention.

FIG. 9 is a flowchart of a method of controlling an application using the motion of an image pickup unit according to another embodiment of the present invention. In FIG. 9, a computer is controlled by corresponding the motion of the image pickup unit to the motion of a virtual pen according to the present embodiment. In the present embodiment, two gestures corresponding to the virtual pen are previously defined.

A first gesture is defined as a motion of a translation motion when the image pickup unit obtains a close image or a pan or tilt motion when the image pickup unit obtains a far image. The first gesture is set to correspond to an action of when a cursor is moved. A second gesture is defined as a motion of when the image pickup unit is temporarily still. The second gesture is set to correspond to an action of when writing with the virtual pen has started or stopped.

In Operation 900, a digital image signal is continuously received, that is, a digital image signal obtained by digitally processing an image input to the image pickup unit is continuously received. In Operation 910, a motion parameter of the received digital image signal is traced. The motion parameter formed by the three translation motions of FIG. 4A and the three rotation motions of FIG. 4B is traced. The traced motion parameter that is formed by the three translation motions and the three rotation motions is expressed by Equation 1.

In Operation 920, a cursor of the virtual pen corresponding to the traced motion parameter is mapped to a screen of an apparatus that is to be controlled. The mapping process is the same as that described in Operation 820 of FIG. 8. The position of the cursor of the virtual pen displayed on a screen of the apparatus can be seen through the mapping.

In Operation 930, it is checked whether the traced motion parameter satisfies the second gesture defined as a temporary still motion. When the traced motion parameter satisfies the second gesture, Operation 940 is performed. Otherwise, Operation 970 is performed.

In Operation 940, it is checked whether the present status of the virtual pen is an operational mode of writing with the virtual pen. Since the first gesture is set as the action of when writing with the virtual pen has started or stopped, checking of the present operational mode of the virtual pen is needed. When the present operational mode of the virtual pen is the operational mode of writing with the virtual pen, Operation 950 is performed. When the present operational mode is not the operational mode of writing with the virtual pen, Operation 960 is performed.

In Operation 950, the traced motion parameter writes a letter (does the traced motion parameter do the writing) using a virtual cursor according to the movement of the motion parameter corresponding to the cursor of the virtual pen and Operation 991 is performed. In Operation 960, writing with the cursor of the virtual pen corresponding to the motion parameter is stopped and Operation 991 is performed.

In Operation 970, it is checked whether the present setting of the virtual pen is an operational mode of writing with the virtual pen. Since the first gesture is set as the action of when writing with the virtual pen has started or stopped, checking the present operational mode is needed. When the present operational mode that is set to use the virtual pen is the operational mode of writing with the virtual pen, Operation 980 is performed. When the present operational mode is not the operational mode of writing with the virtual pen, Operation 990 is performed.

In Operation 980, the traced motion parameter writes a letter using a virtual cursor according to the movement of the motion parameter corresponding to the cursor of the virtual pen and Operation 991 is performed. In Operation 990, writing with the cursor of the virtual pen corresponding to the traced motion parameter is stopped and Operation 991 is performed.

In Operation 991, operation unit is proceeded to the next frame and Operation 900 is performed. As described above, when the flowchart of the method of FIG. 9 is performed, a computer using the virtual pen can be controlled with only the motion of the image pickup unit by corresponding to the motion of the image pickup unit to the motion of the virtual pen.

Figure 10:
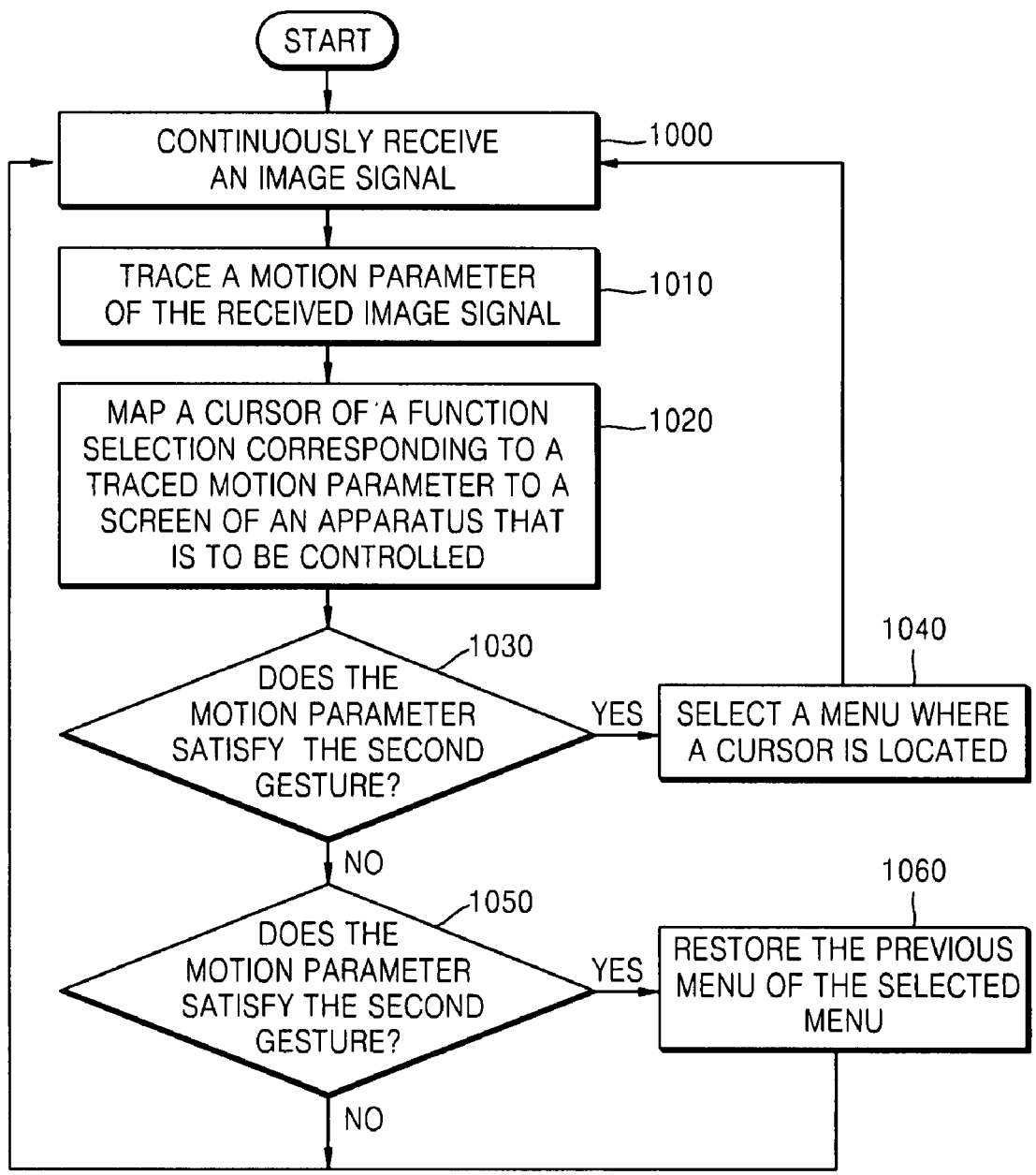
FIG. 10 is a flowchart of a method of controlling an application using the motion of an image pickup unit according to another embodiment of the present invention.

FIG. 10 is a flowchart of a method of controlling an application using the motion of an image pickup unit according to another embodiment of the present invention. In FIG. 10, an apparatus is controlled by corresponding the motion of the image pickup unit to a variety of functions to select a menu of the apparatus. In the present embodiment, three gestures corresponding to the various functions to select a menu of the apparatus are previously defined.

A first gesture is defined as a motion that performs a translation motion when the image pickup unit obtains a close image or a pan or tilt motion when the image pickup unit obtains a far image. The first gesture is set to correspond to a function to select a menu of the apparatus.

A second gesture is defined as a motion when the image pickup unit is temporarily still or a quick motion when the image pickup unit moves toward a front side with respect to a virtual plane. The second gesture is set to correspond to a function to select a menu of the apparatus.

A third gesture is defined as a quick motion that allows the image pickup unit to move toward a rear side with respect to the virtual plane. The third gesture is set to correspond to a function to restore a menu of the previous step of the selected menu.

In Operation 1000, a digital image signal is continuously received, that is, a digital image signal obtained by digitally processing an image input to the image pickup unit is continuously received. In Operation 1010, a motion parameter of a continuously received digital image signal is traced. Hence, the motion parameter formed by the three translation motions of FIG. 4A and the three rotation motions of FIG. 4B is traced and the traced motion parameter is expressed by Equation 1.

In Operation 1020, a cursor to select a function corresponding to the traced motion parameter is mapped to a screen of an apparatus that is to be controlled. The mapping process of the traced motion parameter is the same as that described in Operation 820 of FIG. 8. The position of the cursor of the virtual pen displayed on a screen of the apparatus can be seen on the mapping.

In Operation 1030, it is checked whether the traced motion parameter satisfies the second gesture defined as a temporary still motion or a quick motion moving toward the front with respect to the virtual plane. When the traced motion parameter satisfies the second gesture, Operation 1040 is performed. Otherwise, Operation 1050 is performed. In Operation 1040, a menu where the cursor is located is selected and Operation 1000 is performed.

In Operation 1050, it is checked whether the traced motion parameter satisfies the third gesture defined as a quick motion moving toward the rear side with respect to the virtual plane. When the traced motion parameter satisfies the third gesture, Operation 1060 is performed. Otherwise, Operation 1000 is performed. In Operation 1060, a menu of the previous step of the selected menu is restored and Operation 1000 is performed. As described above, when the flowchart of the method of FIG. 10 is performed, a menu of an apparatus that is to be controlled with only the motion of the image pickup unit by corresponding to the motion of the image pickup unit to the various functions to select a menu of the apparatus.

In the above descriptions, some methods of controlling an application using the motion of an image pickup unit according to the embodiments of the present invention have been described. However, in addition to the above-described embodiments, the present invention can control an application based on the same structure, for example, various hand-held devices such as mobile phones, digital cameras, digital recorders, PDAs (personal digital associates), and remote controllers can control digital TVs, DVDs, and video consoles.

The present invention can also be embodied as computer readable codes on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by one skilled in the art that various changes in form and details may be made therein without departing from the spirit and scope of the invention as defined by the appended claims.

What is claimed is:

1. A method of controlling an application using a motion of an image pickup unit, the method comprising:
storing gestures corresponding to a command in order to control an application;
tracing a motion parameter corresponding to an image that is continuously input;
detecting a gesture corresponding to the traced motion parameter from the stored gestures; and
outputting a control signal of a command corresponding to the detected gesture, wherein the tracing of the motion parameter corresponding to the image that is continuously input comprises:
detecting a characteristic point of the input image;
tracking a trace in time and space of the detected characteristic point from the continuously input image; and
tracing a motion parameter corresponding to the trace in time and space of the tracked characteristic point.

2. The method of claim 1, further comprising continuously obtaining an image through the movement of an apparatus having the image pickup unit, and during the tracing of a motion parameter corresponding to an image that is continuously input, the obtained image is continuously received and a motion parameter corresponding to the received image is traced.

3. The method of claim 1, wherein the storing of the gestures corresponding to a command to control an application further comprises classifying the gestures into gestures controlling the same application and defining the classified gestures as a predetermined set, and the gestures are stored in defined sets.

4. The method of claim 3, wherein the storing of gestures corresponding to a command to control an application further comprises defining gestures corresponding to all commands controlling the application corresponding to a set of the defined gestures, and the defined gestures are stored in defined sets.

5. The method of claim 4, wherein the detecting of a gesture corresponding to the traced motion parameter from the stored gestures comprises:
selecting a set of gestures corresponding to an application receiving the control signal from the sets of gestures; and
detecting a gesture corresponding to the traced motion parameter from the selected set of gestures.

6. The method of claim 1, wherein the motion parameter is formed of three rotation motions and three translation motions.

7. A computer readable recording medium having embodied thereon a program for executing the method of claim 1.

8. An apparatus for controlling an application using a motion of an image pickup unit, the apparatus comprising:
a motion tracing unit tracing a motion parameter corresponding to an image that is constantly input;
a gesture model storing unit storing gestures corresponding to commands to control the application; and
a motion analysis unit detecting a gesture corresponding to a motion parameter by the motion tracing unit from the gesture model storing unit and outputting a control signal of a command corresponding to the detected gesture, wherein the tracing of the motion parameter corresponding to the image that is continuously input comprises:
detecting a characteristic point of the input image;
tracking a trace in time and space of the detected characteristic point from the continuously input image; and
tracing a motion parameter corresponding to the trace in time and space of the tracked characteristic point.

9. The apparatus of claim 8, further comprising an image pickup unit continuously obtaining an image, wherein the motion tracing unit continuously receives the obtained image and traces a motion parameter corresponding to the received image.

10. The apparatus of claim 8, wherein the gesture model storing unit further comprises a gesture set defining unit which classifies the gestures into gestures controlling the same application and defines the classified gestures as a predetermined set, and the gestures are stored in defined sets.

11. The apparatus of claim 10, wherein the gesture model storing unit further comprises a gesture defining unit which defines gestures corresponding to all commands controlling the application corresponding to a set of the defined gestures, and the defined gestures are stored in defined sets.

12. The apparatus of claim 11, wherein the motion analysis unit comprises:
 a gesture set selection unit selecting a set of gestures corresponding to an application receiving the control signal from the sets of gestures stored in the gesture model storing unit; and
 a gesture selection unit detecting a gesture corresponding to the traced motion parameter from the selected set of gestures.

13. The apparatus of claim 8, wherein the motion parameter is formed of three rotation motions and three translation motions.

* * * * *